United States Patent [19]

Ray

[11] 3,847,029
[45] Nov. 12, 1974

[54] ENDLESS POWER TRANSMISSION BELT AND METHOD OF MAKING SAME

[75] Inventor: Robert L. Ray, Springfield, Mo.

[73] Assignee: Dayco Corporation, Dayton, Ohio

[22] Filed: Dec. 11, 1972

[21] Appl. No.: 314,058

[52] U.S. Cl. ............................................. 74/233
[51] Int. Cl. ........................................... F16q 5/16
[58] Field of Search .................. 156/137, 138, 140; 74/231 R, 231 P, 233, 234, 237

[56] References Cited
UNITED STATES PATENTS

| | | | |
|---|---|---|---|
| 2,025,278 | 12/1935 | Freedlander | 156/138 |
| 2,724,974 | 11/1955 | Ayres | 74/237 |
| 3,023,192 | 2/1962 | Shivers | 260/75 R |
| 3,051,212 | 8/1962 | Daniels | 74/233 |
| 3,651,014 | 3/1972 | Witsiepe | 260/75 R |
| 3,687,938 | 4/1972 | Fisher | 156/140 |
| 3,723,568 | 3/1972 | Hoeschele | 260/75 R |

FOREIGN PATENTS OR APPLICATIONS 24,370   10/1913   Great Britain ..................... 74/234

Primary Examiner—Charles J. Myhre
Assistant Examiner—R. H. Lazarus

[57] ABSTRACT

An endless power transmission belt and method of making same is provided wherein the belt has a body made substantially of a thermoplastic elastomer and the body has a heat-fused area at a location along its endless path which has physical properties which are substantially equal to the physical properties of the remainder of the body.

7 Claims, 8 Drawing Figures

PATENTED NOV 12 1974  3,847,029

3,847,029

ENDLESS POWER TRANSMISSION BELT AND METHOD OF MAKING SAME

BACKGROUND OF THE INVENTION

Endless power transmission belts in current use are generally made utilizing materials and processes which either require complex curing procedures or other expensive treatments in order to assure that such endless belts will provide satisfactory performance. In addition, in producing belts employing presently used techniques wherein a belt construction or sleeve is formed around a build-up drum or cylinder in the usual manner there is considerable waste, such as, so-called "ring scrap."

SUMMARY

This invention provides an improved endless power transmission belt and method of making same inexpensively and free of waste wherein such belt has a body made substantially of a thermoplastic elastomer with the body having a heat-fused area at a location along its endless path which has physical properties which are substantially equal to the physical properties of the remainder of the body.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 6:
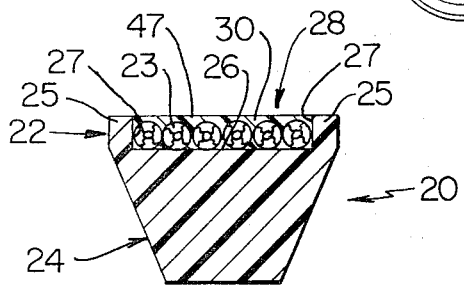
FIG. 6 is a view of an entire endless belt after cutting and removal from the cylinder of FIG. 5 and particularly illustrating by dotted lines the heat-fused area of such belt.
Figure 7:
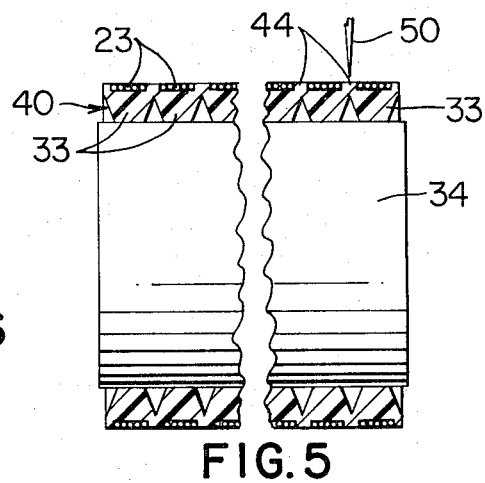
FIG. 7 is an enlarged cross-sectional view of the belt of FIG. 6.

Reference is now made to FIGS. 6 and 7 of the drawing which illustrate an exemplary power transmission belt of this invention which has a substantially trapezoidal crosssectional outline and such belt is designated generally by the reference numeral 20. The belt 20 comprises a body made of a thermoplastic elastomer and such body has a heat-fused area at a location, designated generally at 21, along its endless path which has physical properties which are substantially equal to the physical properties of the remainder of the body. The belt 20 has what are usually referred to as a tension section 22, load carrying means in the form of a load carrying cord 23, and a compression section 24, and, the body has a pair of spaced integral projections each designated by the reference numeral 25 provided at opposite side portions thereof and each of the projections 25 extends in an endless path and is also heat fused in the area 21 so that the physical properties of each projection in the heat-fused area are also substantially equal to the physical properties of the remainder of the body.

The belt body, as viewed in cross section, has a top recessed surface 26 in the central portion thereof and each of the projections 25 has an inside surface 27 adjoining an associated terminal edge of the recessed surface 26 and the surfaces 26 and 27 cooperate to define what may be considered a channel-like configuration or channel 28. The load-carrying cord 23 is integrally bonded within the channel-like configuration by another thermoplastic elastomer 30 which is shown in FIG. 7 with differently inclined cross hatching and the thermoplastic elastomer 30 is compatible with the thermoplastic elastomer of the main body and serves the dual purpose of bonding the load-carrying cord 23 to the remainder of the body while serving as a matrix therefor. As will be apparent from FIG. 7, the top surface 26 has a rectilinear configuration when viewed in cross section and the surfaces 27 extend perpendicularly thereto so that the channel 28 is substantially rectangular in outline.

The belt 20 is made in accordance with the unique method of this invention so that each belt has optimum strength yet may be produced substantially without scrap, such as ring scrap, or the like. The method will now be described in connection with FIGS. 1–5 of the drawing.

Figure 1:
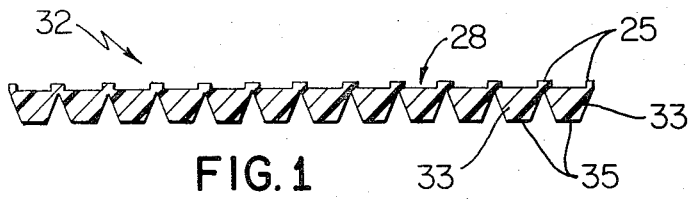
FIG. 1 is a cross-sectional view of an elongated strip of a thermoplastic elastomer having integral side-by-side belt body elements.
Figure 2:
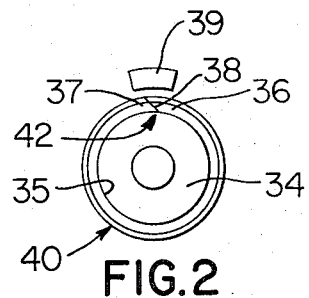
FIG. 2 is an end view illustrating a method step wherein the strip of FIG. 1 is wrapped around a building cylinder and has its ends heat fused together to define a continuous sleeve around such cylinder.

In particular, a strip 32 of a thermoplastic elastomer is provided such as by extrusion process, for example, so as to define the strip 32 which has a plurality of integral side-by-side belt body elements each designated by the same reference numeral 33 and as shown in FIG. 1. The strip 32 is wrapped around a building drum or cylinder 34 as illustrated in FIG. 2 and so that the bottom surface 35 of each element 33 engages the cylinder 34. The opposite end portions 36 and 37 of the strip 32 are then heated so as to heat seal or heat fuse their terminal ends together.

The heat fusing is provided using any suitable junction or joint which allows a smooth uninterrupted connection of the adjoining ends. In this example a bevel joint 38 is employed and heat is provided by any suitable heating device 39 of known construction so as to define a belt construction or sleeve 40 having a fused area indicated generally at 42. The sleeve 40 is then allowed to cool preferably to normal ambient temperature and further processed in a manner to be described subsequently.

As will be apparent from FIG. 1, each body element 33 has a channel-like configuration or channel defined in the top central portion thereof and each body element has a pair of sapced integral projections provided at opposed side portions thereof and for easy identification and correlation with corresponding parts of the completed belt these components have been given the same reference numerals 28 and 25 respectively as in the belt 20.

During the step of heat fusing the ends 36 and 37 of the strip 32 as described in connection with FIG. 2, the upwardly extending projections 25 are also heat fused in the area indicated at 42 whereby the heat-fused sleeve 40 has an upwardly extending projection 25 at its opposite sides while having an integral double-thickness disc-like ridge or structure 44 between each adjoining pair of body elements 33.

Figure 3:
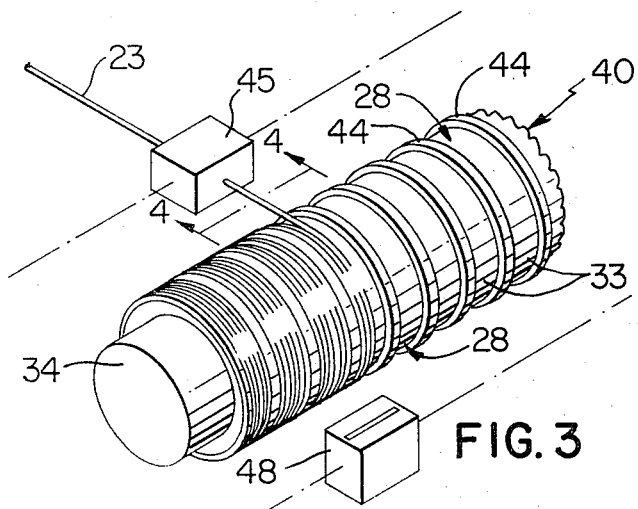
FIG. 3 is a perspective view illustrating the manner in which load-carrying means in the form of a load-carrying cord is spirally wound in position within a channel provided in each body element.

Once the area 42 of sleeve 40 has cooled to normal ambient temperature, load-carrying means in the form of a load-carrying cord, also designated by the reference numeral 23, is spirally wound or coiled, as shown in FIG. 3, in the channel 28 and between the projections 25 of each belt element 33. The spiral winding is achieved along the full length of the cylinder 34 by a skip spinning technique wherein the required cord is wound in one channel, then moved across an adjoining structure and the operation repeated in the next immediately adjacent channel 28 along the full length of the cylinder 34. After completely winding the cord 23 in all the channels 28 of sleeve 40 the cord 23 is cut at the location where it crosses a structure and each free end pushed within a groove.

Figure 4:
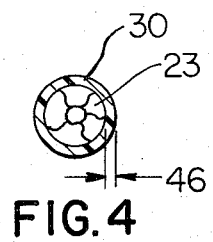
FIG. 4 is a greatly enlarged cross-sectional view of the load-carrying cord taken on the line 4—4 of FIG. 3 and particularly illustrating a comparatively thick coating of a thermoplastic elastomer surrounding such cord.

The cord 23 is provided from a suitable supply roll thereof (not shown) and is coated with a coating of a thermoplastic elastomer also designated by the reference numeral 30 in FIG. 4 and the elastomer 30 is compatible with the thermoplastic elastomer used to define the sheet 32. The cord 23 may be coated with a molten or liquid thermoplastic elastomer 32 using any suitable applicator device 45 and directly wound in position within each channel or groove 28 of an associated body element 33. As the cord 23 is wound in position the thermoplastic elastomer 30 serves the dual purpose of bonding the cord 23 to the main portion of the body element 33 while also serving as a matrix therefor, see FIG. 7. It will be seen from FIG. 4 that a sufficient thickness 46 of coating 30 is provided so that the volume in channel 28 surrounding the wound cord 23 is substantially filled to provide a top surface 47 (FIG. 7) for the completed belt 20 which is substantially flush with the top surfaces of the projections 25 and without requiring further processing.

In some instances during the carrying out of the method steps of this invention, it may be desired to heat the coated cord 23 as it is being wound in its channel 28. Any suitable heating device, such as the heating device 48, may be used and such heating device assures that the temperature of the thermoplastic elastomer 30 is kept above its melt temperature to assure that the cord 23 will be suitably embedded and bonded in position whereby the cord 23 is completely encapsulated in its matrix 30 upon cooling of such matrix below the melt temperature.

Alternatively, it may be desired in some applications of this invention to also treat the cord 23 with a suitable solvent to assure the provision of a tenacious bond between the thermoplastic elastomer 30 and the remainder of its associated body element 33 upon cooling.

Figure 5:
FIG. 5 is a view with parts in elevation, parts in cross section, and parts broken away particularly illustrating the manner in which the sleeve is cut to define a plurality of endless power transmission belts of this invention.

The sleeve 40 with each length of load-carrying cord 23 embedded and bonded in position on an associated element 33 is then cut utilizing a suitable knife or cutter 50 as illustrated in FIG. 5. During the cutting action, the drum 34 with its sleeve 40 and cutter are relatively rotated utilizing any suitable technique. The cutting action is achieved so that an end belt 20 is cut first whereupon the cutter 50 and drum 34 are moved apart and subsequently moved into cutting engagement in a serial manner to bisect each double-thickness structure 44 between each adjoining pair of belt elements 33. This operation is repeated until the entire sleeve is cut and a plurality of belts 20 corresponding in number to the number of belt elements 33 in the strip 32 are defined. It will be appreciated that this cutting action is provided without any waste.

Figure 8:
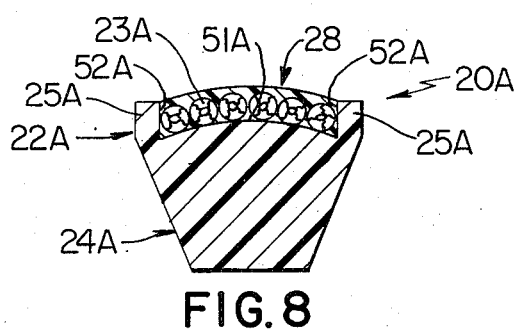
FIG. 8 is a cross-sectional view similar to FIG. 7 illustrating another exemplary embodiment of an endless power transmission belt of this invention.

Another exemplary embodiment of this invention is illustrated in FIG. 8 of the drawing. The belt illustrated in FIG. 8 is very similar to the belt 20; therefore, such belt will be designated generally by the reference numeral 20A and parts of the belt 20A which are very similar to corresponding parts of the belt 20 will be designated by the same numeral as in the belt 20, also followed by the designation letter "A" and not described again. Only those component parts which are substantially different from corresponding parts of the belt 20 will be designated by a new reference numeral also followed by the letter designation "A" and described in detail.

The belt 20A has a tension section 22A, a load-carrying cord 23A, and a compression section 24A, and it will be seen that the main body also has a pair of spaced integral projections 25A. The belt body as viewed in cross section has a channel-like configuration or channel 28A provided therein and in this example such channel 28A is defined by a surface 51A in the main body which has an arcuate configuration and an inside surface 52A on each of the projections 25A. Each surface 52A adjoins an associated terminal edge of the arcuate surface 51A and is arranged substantially transverse thereto. The arcuate surfaces 51A is outwardly convex toward the outer top surfaces of the projections 25A.

The belt 20A is made using essentially the same method steps used to make the belt 20 whereby the detailed method steps will not be repeated; however, it will be appreciated that a strip similar to strip 32 is provided and such strip has a plurality of belt body elements which differ from elements 33 primarily in the configuration and arrangement of the surfaces defining each channel 28A in a belt body element.

The strip 32, which is a sheet-like strip, used to define the belt 20 has been described as being made preferably by an extrusion process. However, it will be appreciated that such strip may be made utilizing any suitable technique or method known in the art such as casting, injection molding, etc.

It will also be appreciated that a strip which is similar to the strip 32 may be made having multiple V-belt elements or sections and by extrusion coating, melt casting, dip coating, calendar coating, spread coating, or solution coating layer means defined by a single layer or a plurality of layers of fabric-type material with a suitable thermoplastic elastomer to define a flat sheet having the desired thickness of elastomer thereon. The cooled flat sheet may be subsequently formed using heat and pressure to define a strip of multiple V-belt sections or elements similar to the body elements 33 comprising the strip 32 except that the layer means of fabric-type material is embedded in the compression sections of the belt elements. Each belt defined using the above-described method and having one or more fabric layers has a better controlled cross-wise stiffness or rigidity.

In this disclosure of the invention the cords 23 and 23A of the belts 20 and 20A respectively are shown symbolically in the drawing as fiber cords. However, it will be appreciated that such cords may be made of any suitable material, such as polyester, rayon, glass, polyvinyl acetate, wire, or other suitable material.

The thermoplastic elastomer used to define the main body of the belts 20 and 20A as well as the thermoplastic elastomer used comprising the tension sections 22 and 22A of the respective belts 20 and 20A may be any suitable thermoplastic elastomer and preferably in the form of a polyester elastomer. For example, it has been found that a thermoplatic polyester elastomer sold under the trademark of "HYTREL" and made by the E. I. DuPont de Nemours Company of Wilmington, Delaware, may be used in making the belts 20 and 20A of this invention.

The heating devices 39 and 48 illustrated in FIGS. 2 and 4 respectively are such that the polyester elastomer being heated is at the desired temperature and such temperature may range between 350° and 700°F.

In this disclosure of the invention the various apparatus have not been illustrated and described for supporting and rotating the cylinder 34 and for supporting and moving the cutter 50. However, it will be appreciated that any suitable apparatus known in the art may be provided for these purposes.

It will also be appreciated that the devices 45 and 48 illustrated in FIG. 3 may be suitably supported for movement parallel to the longitudinal axis of the cylinder 34 while being supported at the desired positions spaced from the periphery of such cylinder and if desired the devices 45 and 48 may be kept stationary with the cylinder 34 being movable or both the cylinder 34 and devices 45 and 48 may be axially movable in order to achieve the desired performance.

A thermoplastic elastomer, such as a thermoplastic polyester elastomer, for example of the type used in this invention to define strip 32 and matrix 30 has important characteristics. In particular, such thermoplastic elastomer is not cured by cross-linking of molecules whereby it does not continue to harden with time and temperature as thermosetting rubber compounds do. Further, such a thermoplastic elastomer may be reprocessed without significantly affecting physical properties. This particular characteristic makes possible heat fusing as shown at 21 for belt 20 without significantly affecting physical properties of the elastomer in the area of fusion. In short, the fused area 21 has substantially the same physical properites as the remainder of its belt.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising the body made substantially of a thermoplastic polyester elastomer, said body having a pair of spaced integral projections provided at opposite side portions thereof and defining a channel in the outer surface of said body, said belt having load-carrying means integrally bonded within said channel and a heat-fused area at a location along its endless path which has physical properties substantially equal to the physical properties of the remainder of said body, each of said integral projections extending along the entire endless path of said belt and having a substantially uniform cross-sectional configuration at any location along the endless path, and each of said integral projections being heat fused at said heat-fused area.

2. A belt as set forth in claim 1 and being made substantially of a polyester elastomer.

3. A belt as set forth in claim 1 in which said load-carrying means are integrally bonded within said channel-like configuration by another thermoplastic elastomer which is compatible with said thermopalstic elastomer of said body.

4. A belt as set forth in claim 3 in which said load-carrying means comprises a spirally wound endless cord and wherein said other thermoplastic elastomer serves the dual purpose of bonding said cord and body while serving as a matrix therefor.

5. A belt as set forth in claim 3 in which said recessed surface has a rectilinear configuration when viewed in cross section.

6. A belt as set forth in claim 3 in which said recessed surface has an arcuate configuration when viewed in cross section.

7. A belt as set forth in claim 3 in which said arcuate configuration is convex in the general direction toward the outer ends of said projections.

* * * * *